United States Patent [19]
Chen

[11] Patent Number: 6,137,242
[45] Date of Patent: Oct. 24, 2000

[54] CIRCUIT FOR REGULATING OUTPUT POWER SOURCE ACCORDING TO THE DIFFERENT OPEN-CIRCUIT TIME OF INPUT AC POWER SOURCE AND THE METHOD THEREOF

[75] Inventor: Ming-Chan Chen, Panchiao, Taiwan

[73] Assignee: Phei Kuan Electronic Co., Ltd., Panchiao, Taiwan

[21] Appl. No.: 09/229,964

[22] Filed: Jan. 14, 1999

[51] Int. Cl.[7] .................................................. H05B 37/02
[52] U.S. Cl. .......................... 315/360; 315/307; 315/362; 307/31
[58] Field of Search ..................................... 315/193, 268, 315/272, 291, 292, 301, 307, 349, 352, 360, 209 R, 224, 362, 200 R; 307/31, 34, 42, 38

[56] References Cited

U.S. PATENT DOCUMENTS

| | | | |
|---|---|---|---|
| 3,864,579 | 2/1975 | Klasing | 307/31 |
| 4,338,562 | 7/1982 | Terwilliger | 315/360 |
| 5,111,118 | 5/1992 | Fellows et al. | 315/307 |
| 5,686,766 | 11/1997 | Tamechika | 307/31 |
| 5,798,619 | 8/1998 | Covington | 315/200 R |
| 5,872,430 | 2/1999 | Konopka | 315/244 |
| 5,949,197 | 9/1999 | Kastner | 31/291 |
| 5,949,198 | 9/1999 | Nakamura et al. | 315/307 |

*Primary Examiner*—Don Wong
*Assistant Examiner*—Thuy Vinh Tran
*Attorney, Agent, or Firm*—Bacon & Thomas, PLLC

[57] ABSTRACT

A circuit for regulating output power varies the output power based on the time that a connection to an AC power source is open. A microprocessor determines the open-circuit time of the input power source and varies a power source signal in response to the open-circuit time. The power source signal is, in turn, supplied to a trigger circuit that supplies power to a load to control the output power.

10 Claims, 7 Drawing Sheets

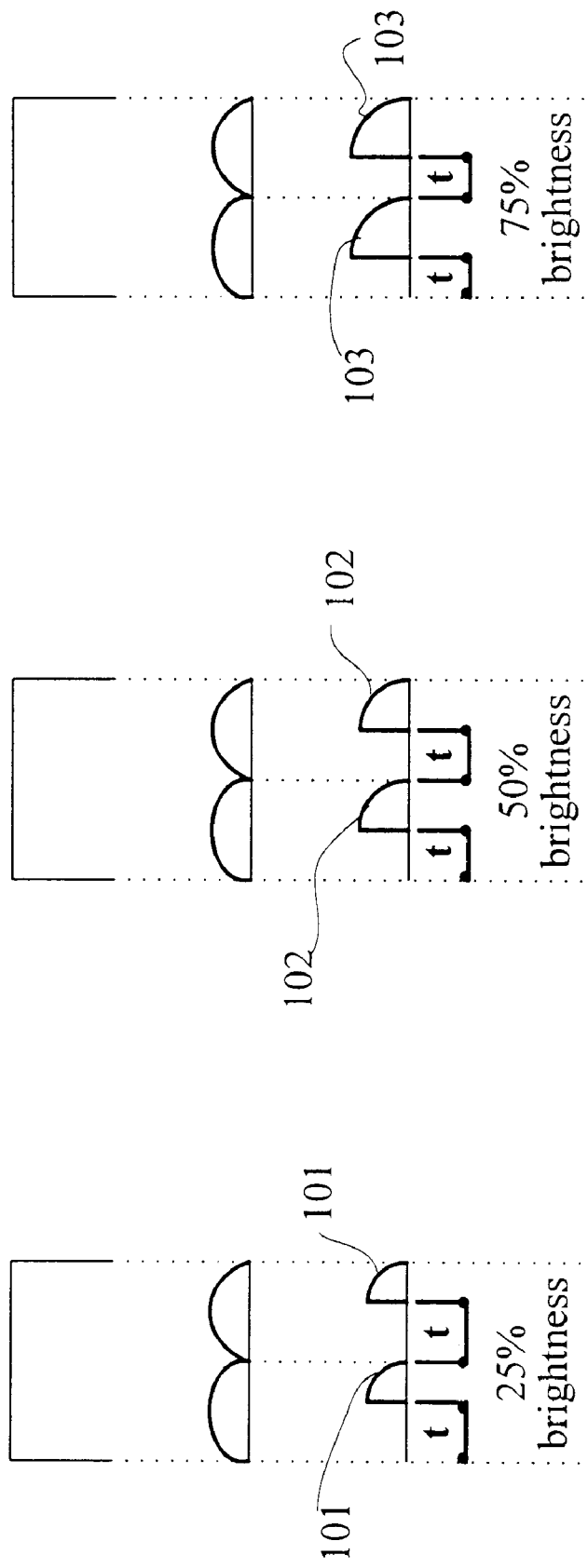

CIRCUIT FOR REGULATING OUTPUT POWER SOURCE ACCORDING TO THE DIFFERENT OPEN-CIRCUIT TIME OF INPUT AC POWER SOURCE AND THE METHOD THEREOF

BACKGROUND OF THE INVENTION

1. Scope of the Present Invention

The present invention relates to a circuit for regulating power output to a load according to the open-circuit time of an input AC power source to a method of regulating power output to a load and particularly to a method applicable to the output power source control of an electric device. Therefore, the application of the present invention is very widespread. When the present invention is applied to a device for controlling the bulb brightness, the user needs only to control the open circuit time of the input power source to regulate the bulb brightness. Through utilizing a manner of digitizing control, the present invention can obviously enhance the effective life of electric appliances and the convenience of operation control of electric appliances.

2. Disclosure of Prior Art

It is well known that so far as the conventional techniques are concerned, there are a variety of control switches for different electric appliances. According to the different categories of electric appliances to be controlled, these control switches include the revolving speed controller to regulate the revolving speed and the brightness controller to regulate the brightness of a light source such as an electric light etc. However, no matter whether the control switch is a revolving speed controller or a brightness controller, the signal source used to control these controllers has to be provided externally. And, the operating principle of these control switches is to control the extent of revolving speed or glow of the controlled electric appliances through controlling the intensity of current flowing into the controlled electric appliances.

In addition, most of the conventional regulating circuits of these switches consisting of capacitors and resistors to regulate current (voltage), are of an analog type. This not only causes the electric appliances to consume more power, but also requires the user to install a controller on the circuits of these switches, and repeated long term use of the controller will often cause damage to the controller or the controlled electric appliance. Therefore, the conventional controller is very undesirable.

SUMMARY OF THE INVENTION

The present invention relates to a circuit for regulating output power according to the open-circuit time of an input AC power source, and to a method for such regulation. According to the present invention, the method is to use a microprocessor to determine whether the voltage signal at the input end thereof is open or not. If the voltage signal at the input end indicates an intermittently open circuit, the microprocessor can detect the time length of the open power source. If the intermittent time detected by the microprocessor is longer, a corresponding trigger signal is sent from the output end of the microprocessor to control the bulb brightness. The trigger signal is an intermittently closed signal to control the average bulb brightness in an intermittent closing manner, so the present invention can control the output power source signal without externally providing an additional signal source for the control.

The primary object of the present invention is to provide a circuit and a method for users who can regulate the output of the power source according to the time length of the open power source without changing the original distribution structure of their electric appliances. Also, the digitizing control manner utilized in the present invention not only can enhance the stability of electric appliances under use but also can maintain the controlled power source output at a very precise level.

The objects, shape, structure, device, characteristics and functions of the present invention can be best described and understood in detail in conjunction with the embodiments and drawings as follows:

BRIEF DESCRIPTION OF THE DRAWINGS

FIG. 7 is an embodiment of the signal at the input end of the microprocessor corresponding to the signal at the output end thereof according to the present invention.

FIG. 8 is another embodiment of the signal at the input end of the microprocessor corresponding to the signal at the output end thereof according to the present invention.

FIG. 9 is still another embodiment of the signal at the input end of the microprocessor corresponding to the signal at the output end thereof according to the present invention.

DETAILED DESCRIPTION OF THE PREFERRED EMBODIMENT

Figure 1:
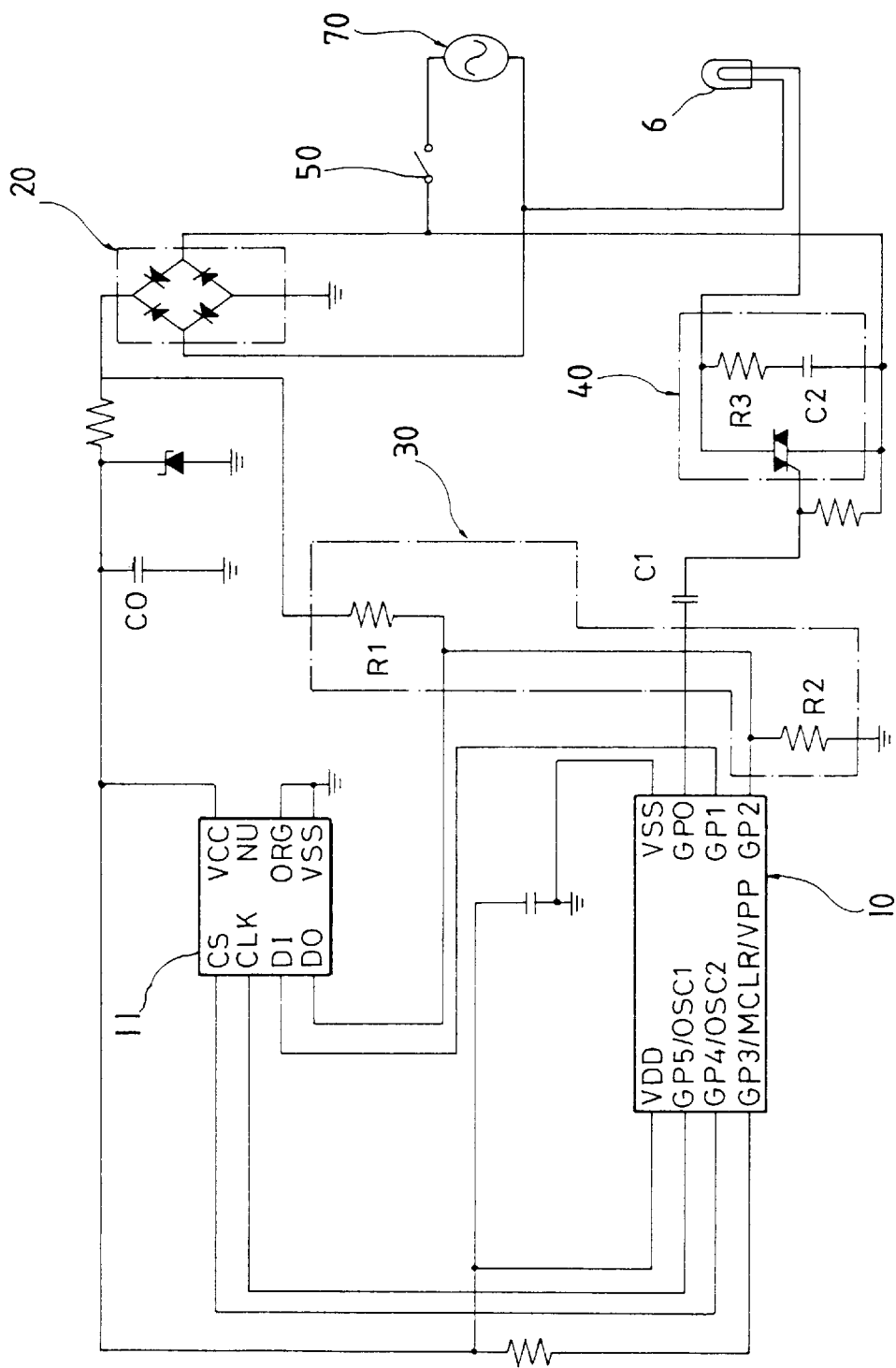
FIG. 1 is a circuit diagram of the present invention.

The present invention is a circuit for regulating output power according to the open-circuit time of input AC power source and to a method of achieving such regulation. As shown in FIG. 1, the circuit is provided with a microprocessor 10, a memory 11, a rectification circuit 20, a voltage dividing circuit 30, a trigger circuit 40, a control switch 50 and a power storage device 60.

Figure 2:
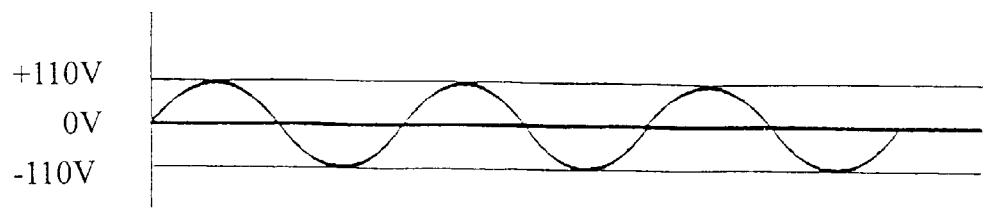
FIG. 2 is a signal graph of AC 110V voltage.

The microprocessor 10 is connected to the output end of the memory 11, the output end of the voltage dividing circuit 30, and the input end of the trigger circuit 40. The input end of the voltage dividing circuit 30 is connected to the output end of the rectification circuit 20, and the output end of the trigger circuit 40 is connected to a bulb 6. A control switch 50 is provided between and connected to the input end of the rectification circuit 20 and a supply power source 70. The supply power source 70 in an embodiment of the present invention can be a 110V AC power source (as shown in FIG. 2). The power storage device in this embodiment can be a capacitor CO of which one end is respectively connected to the power source end of the microprocessor 10 the other and the power source end of the memory 11, the other end is connected to ground.

Figure 3:
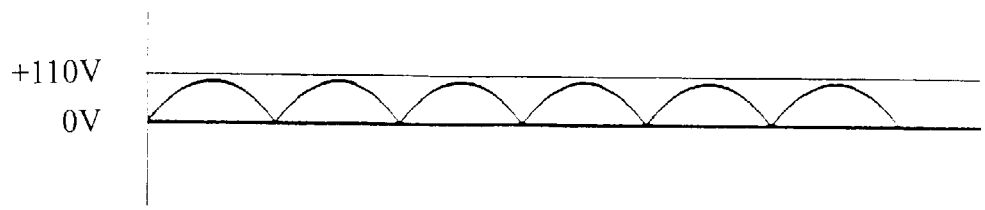
FIG. 3 is a signal graph of AC 110V voltage after a full wave rectification.

Referring to FIG. 1, when the control switch 50 is in a closed state, the rectification circuit 20 rectifies the input AC supply voltage signal to be a full wave voltage signal (as shown in FIG. 3). In this embodiment of the present invention the rectification circuit 20 can be a bridge rectifier or a full wave rectifier.

Figure 4:
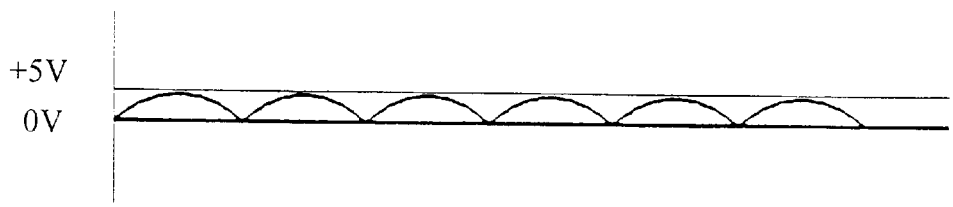
FIG. 4 is a signal graph of AC 110V voltage after a full wave rectification and voltage drop.

As shown in FIG. 1, the voltage dividing circuit 30 consists of a resistor R1 and a resistor R2. The input end of the resistor R1 is connected to the output end of the rectification circuit 20, the output end of the resistor R1 is connected to the input end of the resistor R2, and the output end of the resistor R2 is connected to the ground. The output end of the voltage dividing circuit 30, where the resistors R1 and R2 are connected to each other, is connected to an input end of the microprocessor 10. In this embodiment, the ratio value between R2 and R1+R2 is 1:22, so that the voltage dividing circuit 30 drops the 110V full wave voltage to a 5V full wave voltage as shown in FIG. 4. When the voltage dividing circuit 30 outputs a 5V voltage at the output end thereof, the microprocessor 10 can sense the existence of the voltage signal.

Figure 5:
FIG. 5 is a signal graph of noise.

Again referring to FIG. 1, when the control switch 50 changes from closing to opening, the power source signal at the input end of the rectification circuit 20 disappears, leaving only a few residual noises at the input end of the rectification circuit 20 (as shown in FIG. 5). Since the voltage being sent out by the voltage dividing circuit 30 approximates to zero, the input end of the microprocessor 10 cannot detect a signal with voltage. However, the power storage device 60 still has enough power source supplied to the microprocessor 10 and the memory 11 for operation.

Figure 6:
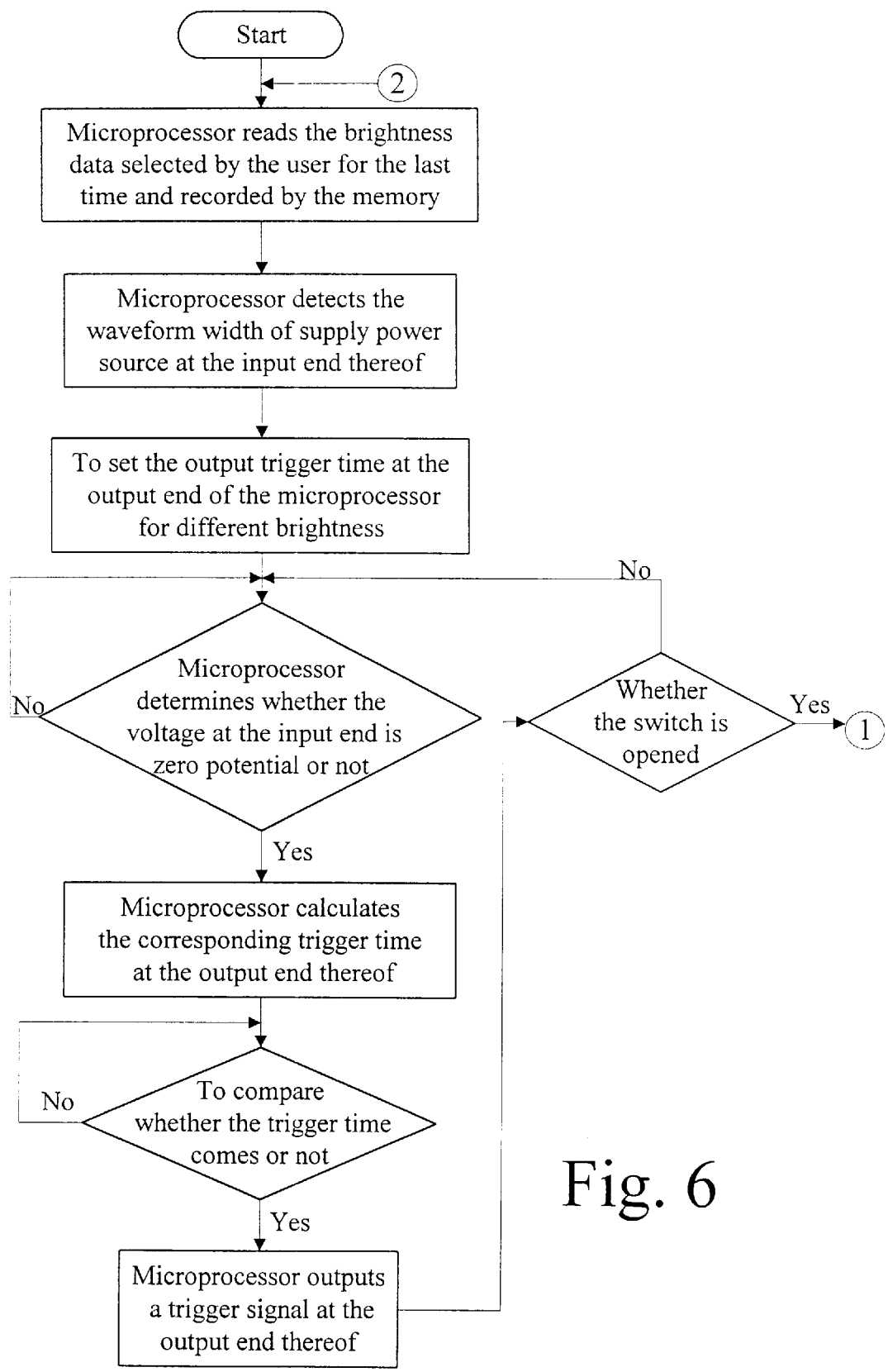
FIG. 6 is a main flow chart of the microprocessor performing the output power source signal according to the power source signal from the input end thereof according to the present invention.

The microprocessor 10 is provided with a voltage level detecting module, FIG. 6 is the implementation flow of said module. After the supply power source of the microprocessor 10 is reset, the microprocessor 10 reads the correlative control data value stored in the memory 11. This embodiment refers to an electric light, so the information stored in the memory 11 is the brightness control information of the electric light, and is the brightness set value stored at the last time before the user turned off the power source of the microprocessor 10.

Then the microprocessor 10 detects the waveform width of the supply voltage input from the voltage dividing circuit 30 and sets the corresponding trigger time t at the output end thereof. Referring to FIG. 7, a voltage signal 101 is sent from the output end of the microprocessor 10 at a time corresponding to the period of the trigger time t, which is ¾ period of the original input voltage signal. Similarly, the trigger time t for sending a voltage signal 102, referring to FIG. 8, is ½ period of the original input voltage signal. Referring to FIG. 9, the trigger time t for sending a voltage signal 103 is ¼ period of the original input voltage signal.

Again referring to FIGS. 7, 8 and 9, since. Since the voltage signal at the output end of the microprocessor 10 is triggered at ¾ the period of the original voltage signal, the signal at the output end of the trigger circuit is only 25% of the normal power supply output. Therefore, the brightness of bulb 6 supplied by such a power source signal is 25% the brightness of the normal output voltage waveform. Similarly, when the triggered signal at the output end is only 50% of the normal supply power source, the brightness of bulb 6 supplied by the supply power source is only 50% the brightness of normal voltage waveform. And, when the voltage signal at the output end is triggered at ¼ the period of the original voltage signal, the brightness of bulb 6 supplied by the power source signal at the output end is only 75% the brightness of the normal supply voltage.

Again referring to FIG. 6, the microprocessor 10 determines whether the voltage at the input end thereof is zero voltage or not. When the microprocessor 10 detects that the voltage at the input end is zero voltage, the microprocessor 10 will not output a voltage signal at its output end until reaching the corresponding trigger time t. The trigger circuit 40 will then be driven by the voltage signal to let the bulb 6 generate a corresponding brightness.

Figure 10:
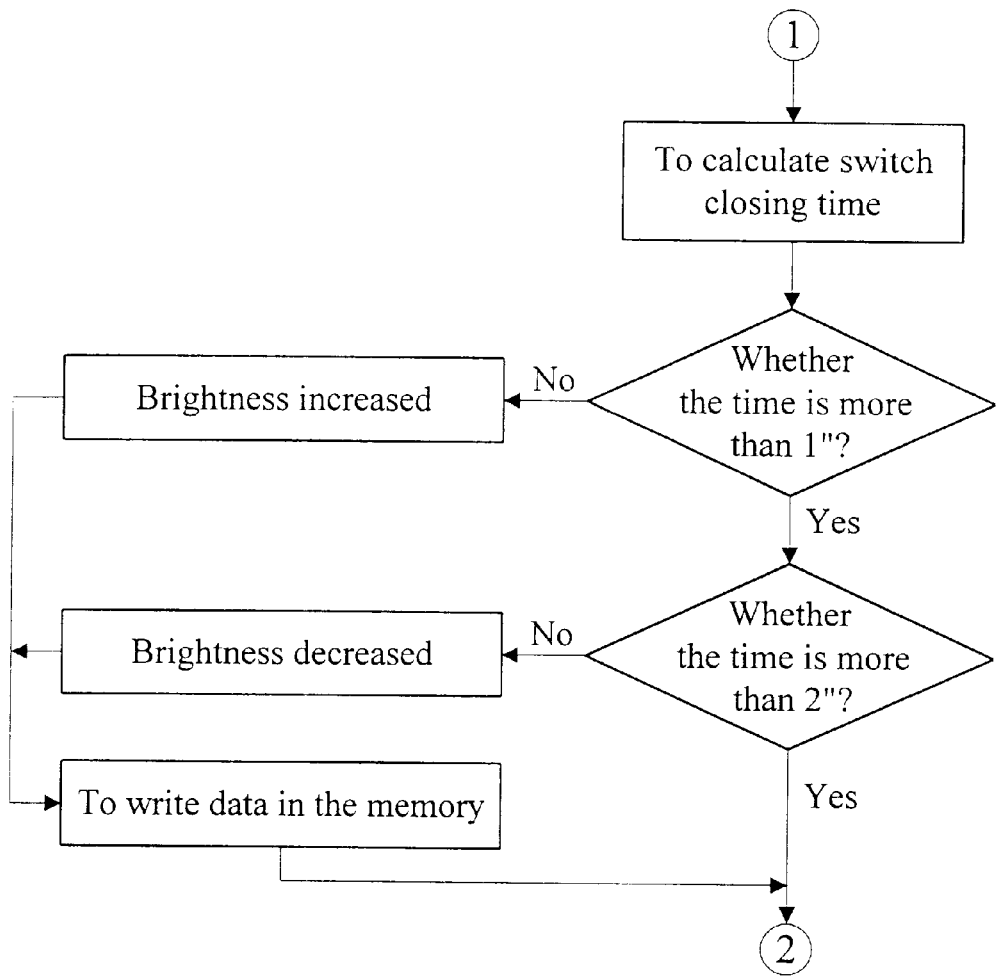
FIG. 10 is a flow chart of the trigger time set by the microprocessor according to the present invention.

In addition, the microprocessor 10 also determines whether the voltage signal at the input end thereof is zero voltage or not (The position of the zero voltage is the starting position of the input voltage signal) and begins to calculate the corresponding trigger time t at the output end thereof. When the period of the trigger time t is reached, the output end of the microprocessor 10 sends out a trigger signal. The microprocessor 10 also detects whether the control switch 50 is opened or not. If the control switch 50 is closed, the microprocessor 10 will again determine whether the voltage signal at the input end thereof is zero voltage or not. If the control switch 50 is opened, then the procedure for changing the period of the trigger time as shown in FIG. 10 are initiated.

Again referring to FIG. 10, the microprocessor 10 detects the open time of the control switch 50. In this embodiment, if the open time of the control switch 50 is not more than 1 second, then the setting values for the brightness of bulb 6 are increased. If the open time of the control switch 50 is between 1 to 2 seconds, then the setting values for the brightness of bulb 6 are decreased. Furthermore, if the open time of the control switch 50 is more than 2 seconds, the microprocessor 10 will keep the brightness of the bulb 6 unchanged. In addition, if the foregoing setting changes the trigger time, the trigger values will be stored in the memory 11. This embodiment will then return to the procedures shown in FIG. 6.

Figure 11:
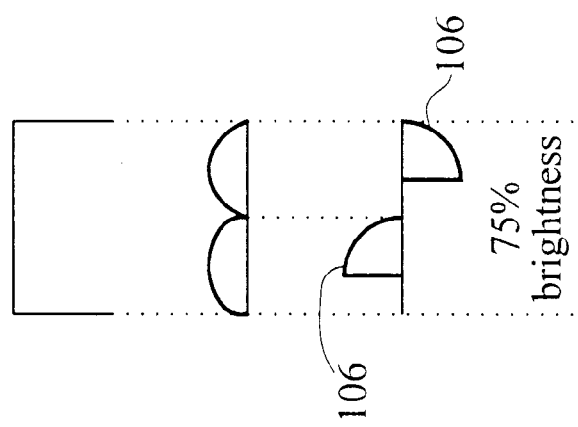
FIG. 11 is a signal graph of an input signal processed by the trigger circuit according to the present invention.
Figure 12:
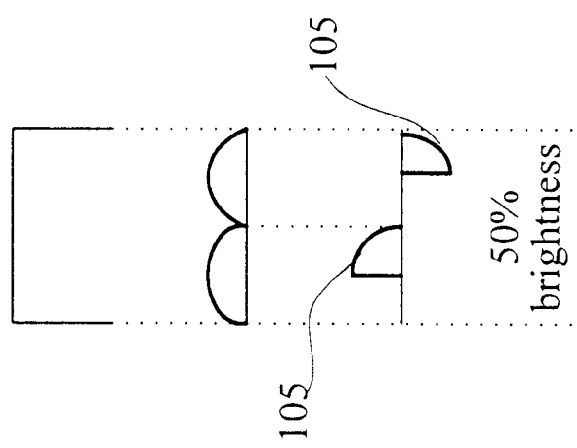
FIG. 12 is a signal graph of another input signal processed by the trigger circuit according to the present invention.
Figure 13:
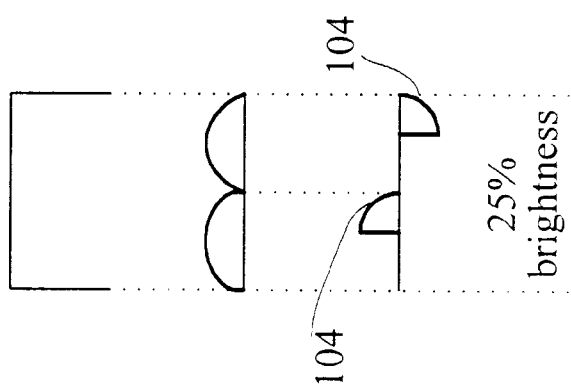
FIG. 13 is a signal graph of still another input signal processed by the trigger circuit according to the present invention.
Figure 14:
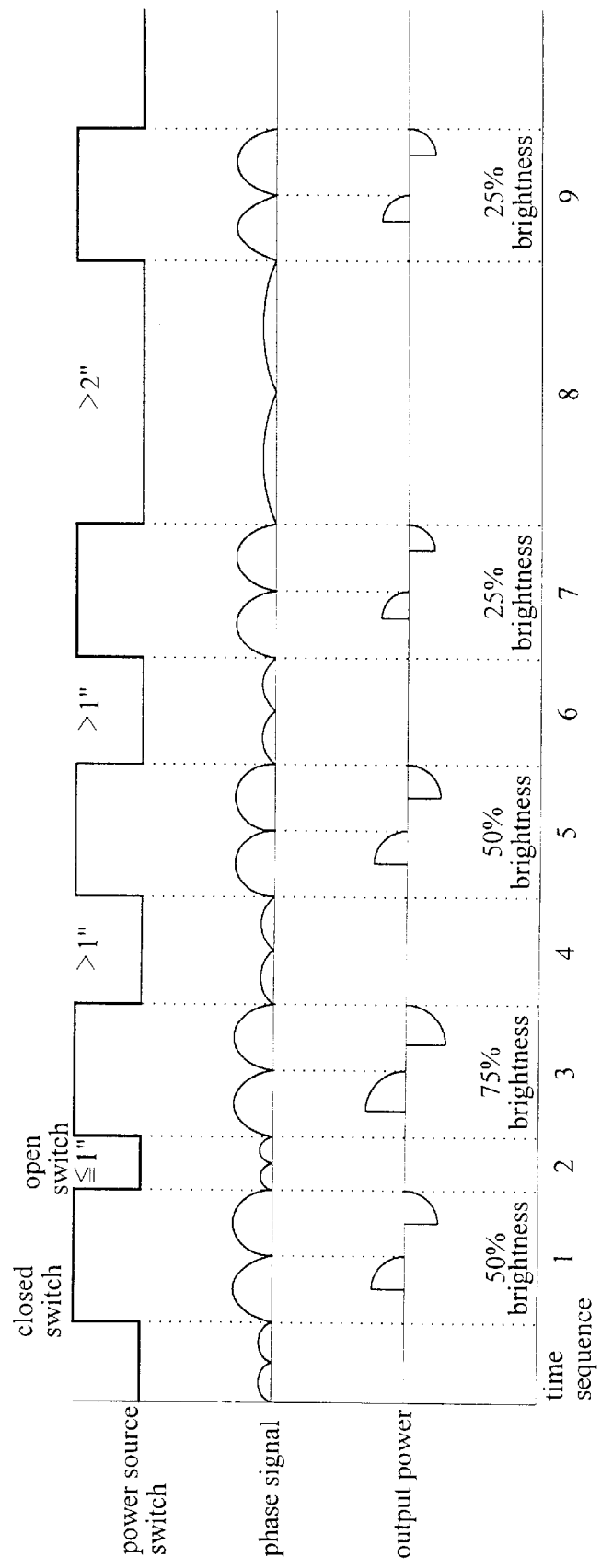
FIG. 14 is a correlative signal graph of an embodiment of the present invention.

Again referring to FIG. 7, after the signal 101 at the output end of the microprocessor 10 is output to the trigger circuit 40, a signal 104 is output from the output end of the trigger circuit 40, as shown in FIG. 11. Similarly, referring to FIG. 7, after the signal 102 is output to the trigger circuit 40, a signal 105 is output from he output end thereof, as shown in FIG. 12. In this embodiment, the trigger circuit 40 can be a thyratron 400 connected in parallel to a resistor R3 and a capacitor C2 as shown in FIG. 14.

What is mentioned above is only a preferred embodiment of the present invention of which the structural characteristics are not by no means confined thereto. Any change or modification in the realm of the present invention easily thought by those skilled at this art is within the scope of claims of this application.

What is claimed is:

1. A circuit for regulating power supplied to a load from an input AC power source according to an open-circuit time of the input AC power source, comprising:

a microprocessor;

a memory connected to the microprocessor;

a rectification circuit with an input end connected to a power source for changing an AC signal of said power source into a full wave power source signal;

a voltage dividing circuit with an input end connected to an output end of said rectification circuit and an output end connected to an input end of said microprocessor for voltage dividing said full wave power source signal and supplying the voltage divided full wave power source signal to said microprocessor;

a trigger circuit having a trigger signal input connected to an output end of said microprocessor and an output end connected to a load, said trigger circuit being arranged to control supply of power to the load in response to a trigger signal supplied by said microprocessor;

a control switch connected between said rectification circuit and said power source; and a power storage device with one end connected to said control switch, a power source end of said microprocessor, and a power source end of said memory for respectively supplying power to said microprocessor and to said memory whether or not said control switch is open;

wherein when said control switch is opened, no voltage is input to said input end of said rectification circuit, and said input end of said microprocessor is unable to detect the voltage divided full wave power source signal, and wherein said microprocessor determines the open-circuit time during which said voltage divided power source signal is not detected and, based on said open-circuit time, controls said trigger signal.

2. A circuit as claimed in claim 1, wherein said load is an electric bulb.

3. A circuit as claimed in claim 1, wherein the rectification circuit is a bridge rectifier.

4. A circuit as claimed in claim 1, wherein the trigger circuit is a thyratron connected in parallel to a capacitor and a resistor.

5. A circuit as claimed in claim 1, wherein the voltage dividing circuit consists of a pair of resistors.

6. A circuit as claimed in claim 1, wherein the power storage device is a capacitor.

7. A circuit as claimed in claim 1, wherein said microprocessor determines, based on said open-circuit time, whether to increase the period of working power a duty cycle of said power supplied to a said load, decrease said period duty cycle, or keep said period duty cycle unchanged via control the output of said power source.

8. A method for regulating a duty cycle of power supplied to a load from an input AC power source according to an open-circuit time of the input AC power source, including the following steps:

opening a control switch connected between a rectification circuit and a power source for a period of time in order to enable a microprocessor to detect a time length during which said switch is opened and, in response, output a corresponding power source signal based on said time length;

driving a trigger circuit by using said power source signal to determine a power output of said trigger circuit.

9. A method as claimed in claim 8, wherein said power source signal determines a duty cycle of said power supplied to said load based on said open-circuit time.

10. A method as claimed in claim 9, wherein said load is a light bulb and said duty cycle determines a brightness of said light bulb, and further comprising the step of storing the value of said brightness of said light bulb in a memory.

* * * * *